United States Patent
Tian et al.

(10) Patent No.: US 11,249,606 B2
(45) Date of Patent: Feb. 15, 2022

(54) METHOD FOR CONTROLLING A FLEXIBLE CAPACITIVE TOUCH DISPLAY PANEL AND TOUCH DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jian Tian, Beijing (CN); Lei Zhang, Beijing (CN); Zouming Xu, Beijing (CN); Xiaodong Xie, Beijing (CN); Jing Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 594 days.

(21) Appl. No.: 16/099,087

(22) PCT Filed: Jan. 9, 2018

(86) PCT No.: PCT/CN2018/071893
§ 371 (c)(1),
(2) Date: Nov. 5, 2018

(87) PCT Pub. No.: WO2018/233279
PCT Pub. Date: Dec. 27, 2018

(65) Prior Publication Data
US 2021/0223932 A1    Jul. 22, 2021

(30) Foreign Application Priority Data
Jun. 20, 2017    (CN) .......................... 201710468055.9

(51) Int. Cl.
*G06F 3/044* (2006.01)
*G06F 3/041* (2006.01)
*G06F 1/16* (2006.01)

(52) U.S. Cl.
CPC .......... *G06F 3/0446* (2019.05); *G06F 1/1652* (2013.01); *G06F 3/0412* (2013.01);
(Continued)

(58) Field of Classification Search
CPC ....... G06F 2203/04102; G06F 3/04164; G06F 3/0446; G06F 3/0447; G06F 3/0412; G06F 1/1652
See application file for complete search history.

(56) References Cited

U.S. PATENT DOCUMENTS

2004/0008191 A1*  1/2004  Poupyrev ................ G06F 3/011
                                                                     345/184
2008/0180399 A1   7/2008  Cheng
(Continued)

FOREIGN PATENT DOCUMENTS

CN    102915143 A     2/2013
CN    103389822 A    11/2013
(Continued)

OTHER PUBLICATIONS

PCT International Search Report, Application No. PCT/CN2018/071893, dated Apr. 12, 2018, 6 pages: with English translation.
(Continued)

*Primary Examiner* — Towfiq Elahi
(74) *Attorney, Agent, or Firm* — Armstrong Teasdale LLP

(57) ABSTRACT

Embodiments of the present disclosure provide a method for controlling a flexible capacitive touch display panel and a corresponding touch display apparatus. The capacitive touch display panel is provided with a plurality of signal lines arranged in a grid shape, and a signal line extending in a first
(Continued)

direction and a signal line extending in a second direction are electrically insulated from each other. In this method, for each of the plurality of signal lines, a drive signal is applied to the signal line as a drive signal line. An induction signal is received from a signal line parallel to and adjacent to the drive signal line as an induction signal line. If an intensity of the induction signal is increased, it is determined that the capacitive touch display panel is bent at a bending location between the drive signal line and the induction signal line.

13 Claims, 5 Drawing Sheets

(52) U.S. Cl.
CPC ........ *G06F 3/0447* (2019.05); *G06F 3/04164* (2019.05); *G06F 2203/04102* (2013.01)

(56) References Cited

U.S. PATENT DOCUMENTS

| | | | |
|---|---|---|---|
| 2012/0235894 A1 | 9/2012 | Phillips | |
| 2013/0044215 A1 | 2/2013 | Rothkopf et al. | |
| 2015/0116608 A1* | 4/2015 | Jeong | G06F 3/0446 349/12 |
| 2017/0097721 A1 | 4/2017 | Wang | |
| 2017/0221456 A1* | 8/2017 | Kim | G09G 3/20 |
| 2018/0120615 A1* | 5/2018 | Wang | G06F 3/0446 |

FOREIGN PATENT DOCUMENTS

| | | |
|---|---|---|
| CN | 104571747 A | 4/2015 |
| CN | 104641320 A | 5/2015 |
| CN | 104731436 A | 6/2015 |
| CN | 105487734 A | 4/2016 |
| CN | 106445267 A | 2/2017 |
| CN | 106558278 A | 4/2017 |
| JP | 2003206001 A | 7/2003 |

OTHER PUBLICATIONS

PCT Written Opinion, Application No. PCT/CN2018/071893, dated Apr. 12, 2018, 5 pages.: with English translation of relevant part.
China First Office Action, Application No. 201710468055.9, dated Nov. 26, 2019, 20 pps.: with English translation.
Indian First Examination Report, Application No. 201827041613, dated Mar. 22, 2021, 6 pps.: with English translation.
European Extended Search Report, Application No. 18792344.6, dated Feb. 19, 2021, 9 pps.

\* cited by examiner

METHOD FOR CONTROLLING A FLEXIBLE CAPACITIVE TOUCH DISPLAY PANEL AND TOUCH DISPLAY APPARATUS

CROSS REFERENCE TO RELATED APPLICATIONS

This patent application is a National Stage Entry of PCT/CN2018/071893 filed on Jan. 9, 2018, which claims the benefit and priority of Chinese Patent Application No. 201710468055.9 filed on Jun. 20, 2017, the disclosures of which are incorporated herein by reference in their entirety as part of the present application.

BACKGROUND

The present disclosure relates to the field of display technologies, and more particularly, to a method for controlling a flexible capacitive touch display panel and a touch display apparatus including the capacitive touch display panel.

As a new display input device, a touch display apparatus is a currently popular human-computer interaction mode. The touch display apparatus is mainly applied to various fields such as public information query, industrial control, electronic game, multimedia teaching, and so on.

Based on working principles of touch display panels and media for transmitting information, the touch display panels are classified into resistive touch display panels, capacitive touch display panels, infrared touch display panels, and surface acoustic wave touch display panels. At present, the capacitive touch display panel is popularly used.

With the development of the flexible display apparatus, the capacitive touch display panel may be applied to the flexible display apparatus to implement the flexible capacitive touch display panel.

BRIEF DESCRIPTION

Embodiments set forth in the present disclosure provide a method for controlling a flexible capacitive touch display panel and a touch display apparatus including the capacitive touch display panel. By using the method and the touch display apparatus, a bending location of the capacitive touch display panel can be detected.

A first aspect of the present disclosure provides a method for controlling a flexible capacitive touch display panel. The capacitive touch display panel is provided with a plurality of signal lines arranged in a grid shape, and a signal line extending in a first direction and a signal line extending in a second direction are electrically insulated from each other. The method includes, for each of the plurality of signal lines, applying a drive signal to the signal line as a drive signal line, receiving, from a signal line parallel to and adjacent to the drive signal line as an induction signal line, an induction signal, and determining, in response to an intensity of the induction signal being increased, that the capacitive touch display panel is bent at a bending location between the drive signal line and the induction signal line.

In some embodiments of the present disclosure, the determining, in response to the intensity of the induction signal being increased, that the capacitive touch display panel is bent at the bending location between the drive signal line and the induction signal line includes, for each induction signal line, comparing the induction signal received from the induction signal line with an original induction signal received from the induction signal line when the capacitive touch display panel is in a planar state, and determining that the capacitive touch display panel is bent at the bending location between the drive signal line and the induction signal line in response to the intensity of the induction signal being greater than that of the original induction signal.

In some embodiments of the present disclosure, for each induction signal line, comparing the induction signal received from the induction signal line with an original induction signal received from the induction signal line when the capacitive touch display panel is in a planar state includes converting the induction signal received from the induction signal line into a first digital signal, and comparing the first digital signal with a second digital signal converted from the original induction signal.

In some embodiments of the present disclosure, the determining, in response to the intensity of the induction signal being increased, that the capacitive touch display panel is bent at the bending location between the drive signal line and the induction signal line includes comparing a first induction signal of the induction signal line received from a first induction signal line with a second induction signal of the induction signal line received from a second induction signal line, and determining that the capacitive touch display panel is bent at a bending location between the drive signal line and the first induction signal line in response to the intensity of the first induction signal being greater than that of the second induction signal.

In some embodiments of the present disclosure, the determining, in response to the intensity of the induction signal being increased, that the capacitive touch display panel is bent at the bending location between the drive signal line and the induction signal line further includes, in response to the bending location being not determined, for each induction signal line, comparing the induction signal received from the induction signal line with an original induction signal received from the induction signal line when the capacitive touch display panel is in a planar state, and determining that the capacitive touch display panel is bent at the bending location between the drive signal line and the induction signal line in response to the intensity of the induction signal being greater than that of the original induction signal.

In some embodiments of the present disclosure, the method further includes detecting an attitude of the capacitive touch display panel, and activating a determination of the bending location of the capacitive touch display panel in response to the attitude of the capacitive touch display panel being detected as nonplanar.

In some embodiments of the present disclosure, the method further includes receiving an activation signal, and activating a determination of the bending location of the capacitive touch display panel in response to the activation signal being received.

In some embodiments of the present disclosure, the method further includes determining, in response to a plurality of parallel bending locations being detected on the capacitive touch display panel, whether a distance between two adjacent bending locations of the plurality of parallel bending locations is less than a threshold, and recognizing two adjacent bending locations having a distance less than the threshold as one bending location.

In some embodiments of the present disclosure, the method further includes determining a system mode used by the capacitive touch display panel based on the bending location of the capacitive touch display panel. The system mode is determined as an artistic creation mode in response to the capacitive touch display panel being bent at edges on two sides of the capacitive touch display panel. The system mode is determined as a wristband mode in response to the capacitive touch display panel being bent at a plurality of parallel bending locations. In response to the capacitive touch display panel being bent at its middle to be divided into two parts: the system mode is determined as a laptop mode in the case that one of the two parts is parallel to ground but the other is not, the system mode is determined as a standby mode in the case that both parts are parallel to the ground, otherwise, the system mode is determined as an E-book mode.

A second aspect of the present disclosure provides a touch display apparatus. The touch display apparatus includes a flexible capacitive touch display panel, at least one processor connecting to the capacitive touch display panel, and at least one memory having computer program stored thereon. The capacitive touch display panel is provided with a plurality of signal lines arranged in a grid shape, and a signal line extending in a first direction and a signal line extending in a second direction are electrically insulated from each other. When the computer program is executed by the at least one processor, the touch display apparatus is caused to, for each signal line of the plurality of signal lines, apply a drive signal to the signal line as a drive signal line, receive, from a signal line parallel to and adjacent to the drive signal line as an induction signal line, an induction signal, and determine, in response to an intensity of the induction signal being increased, that the capacitive touch display panel is bent at a bending location between the drive signal line and the induction signal line.

In some embodiments of the present disclosure, when the computer program is executed by the processor, the touch display apparatus is caused to, for each induction signal line, compare the induction signal received from the induction signal line with an original induction signal received from the induction signal line when the capacitive touch display panel is in a planar state by converting the induction signal received from the induction signal line into a first digital signal, and comparing the first digital signal with a second digital signal converted from the original induction signal. Here, the second digital signal is stored in the at least one memory.

In some embodiments of the present disclosure, the capacitive touch display panel further includes at least two spatial location detecting apparatuses. The at least two spatial location detecting apparatuses are respectively positioned on at least one group of opposite sides of the capacitive touch display panel, and can detect an attitude of the capacitive touch display panel and transmit the attitude of the capacitive touch display panel to the processor. When the computer program is executed by the processor, the touch display apparatus is further caused to activate a determination of the bending location of the capacitive touch display panel in the response to the attitude of the capacitive touch display panel being nonplanar.

In further embodiments of the present disclosure, the spatial location detecting apparatus includes a gyroscope.

In some embodiments of the present disclosure, the capacitive touch display panel further includes a key. The key can transmit an activation signal to the processor in response to a press of it. When the computer program is executed by the processor, the touch display apparatus is further caused to activate a determination of the bending location of the capacitive touch display panel in response to the activation signal being received.

BRIEF DESCRIPTION OF THE DRAWINGS

To describe technical solutions of the embodiments of the present disclosure more clearly, the accompanying drawings of the embodiments will be briefly introduced in the following. It should be known that the accompanying drawings in the following description merely involve with some embodiments of the present disclosure, but not limit the present disclosure, in which.

DETAILED DESCRIPTION

To make the technical solutions and advantages of the embodiments of the present disclosure clearer, the technical solutions in the embodiments of the present disclosure will be described clearly and completely below, in conjunction with the accompanying drawings in the embodiments of the present disclosure. Obviously, the described embodiments are merely some but not all of the embodiments of the present disclosure. All other embodiments obtained by those skilled in the art based on the described embodiments of the present disclosure without creative efforts shall fall within the protecting scope of the present disclosure.

Unless otherwise defined, all terms (including technical and scientific terms) used herein have the same meaning as commonly understood by those skilled in the art to which present disclosure belongs. It will be further understood that terms, such as those defined in commonly used dictionaries, should be interpreted as having a meaning that is consistent with their meaning in the context of the specification and will not be interpreted in an idealized or overly formal sense unless expressly so defined herein. As used herein, the description of "connecting" or "coupling" two or more parts together should refer to the parts being directly combined together or being combined via one or more intermediate components.

In all the embodiments of the present disclosure, the terms such as "first" and "second" are merely used to distinguish one step from another step, but do not denote any sequence of performing steps.

Figure 1:
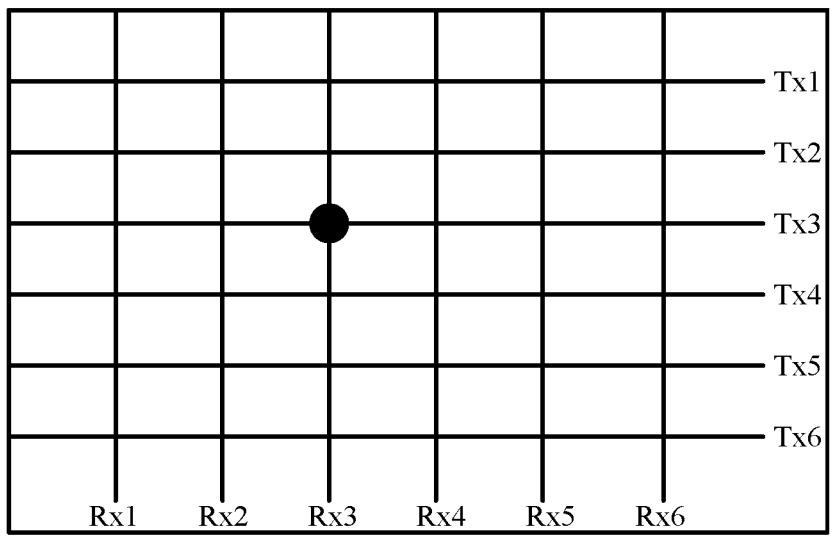
FIG. 1 is a schematic structural diagram of a capacitive touch display panel.

FIG. 1 illustrates a schematic structural diagram of a capacitive touch display panel. The capacitive touch display panel is provided with a plurality of signal lines arranged in a grid shape. Signal lines (Tx1, Tx2, . . . ) in a row direction are configured to transmit drive signals, and signal lines (Rx1, Rx2, . . . ) in a column direction are configured to receive induction signals. The signal lines in the row direction and the signal lines in the column direction are electrically insulated from each other, and capacitance nodes are formed at their intersections. When a finger touches the capacitive touch display panel, for example, when the touch position is the black dot in FIG. 1, the finger attracts away a portion of electric charges of the capacitance node at the touch position. Therefore, the touch position may be determined based on the quantity of electric charges of the capacitance node.

Figure 2:
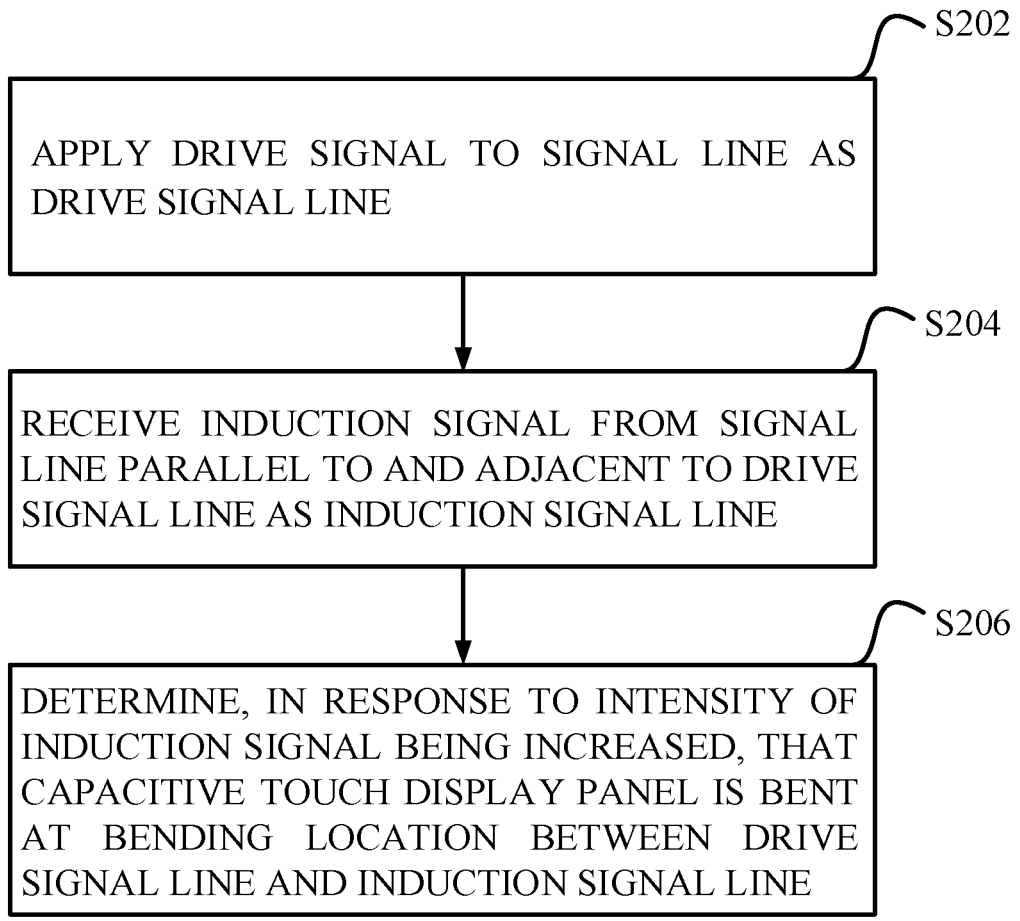
FIG. 2 is a flowchart of a method for controlling a flexible capacitive touch display panel according to an embodiment of the present disclosure.

FIG. 2 illustrates a flowchart of a method for controlling a flexible capacitive touch display panel according to an embodiment of the present disclosure. In this embodiment of the present disclosure, the flexible capacitive touch display panel has a structure identical or similar to that of the capacitive touch display panel as shown in FIG. 1. The capacitive touch display panel is provided with a plurality of signal lines arranged in a grid shape, and a signal line extending in a first direction and a signal line extending in a second direction are electrically insulated from each other. In the method as shown in FIG. 2, for each of the plurality of signal lines of the capacitive touch display panel, following operations may be executed.

In step S202, a drive signal is applied to the signal line. In this case, the signal line serves as a drive signal line.

In step S204, an induction signal is received from a signal line parallel to and adjacent to the drive signal line as an induction signal line. In the case that the drive signal line is a signal line at the outermost side of the capacitive touch display panel, only one signal line at one side of the drive signal line serves as the induction signal line. In other cases, two signal lines at both sides of the drive signal line serve as induction signal lines respectively.

In step S206, it is determined, in response to an intensity of the induction signal being increased, that the capacitive touch display panel is bent at a bending location between the drive signal line and the induction signal line.

In this embodiment of the present disclosure, it may be detected whether the capacitive touch display panel is bent at the bending location between the drive signal line and the induction signal line by comparing the induction signal received from the induction signal line when the drive signal is applied to the drive signal line with an original induction signal received from the induction signal line when the capacitive touch display panel is in a planar state. For example, before step S202 and step S204, in the case that the capacitive touch display panel is in the planar state, for each of the drive signal lines, an induction signal is received from a corresponding induction signal line, and the induction signal is stored as an original induction signal. In step S206, it is determined whether the capacitive touch display panel is bent at the bending location between the drive signal line and the induction signal line by comparing the original induction signal with the corresponding induction signal obtained in step S204. Here, the corresponding induction signal and the original induction signal refer to signals obtained from the same induction signal line in the case that the drive signal is applied to the same drive signal line. Specifically, in step S206, for each of the induction signal lines, the induction signal received from the induction signal line is compared with a corresponding original induction signal. It is determined that the capacitive touch display panel is bent at the bending location between the drive signal line and the induction signal line if the intensity of the induction signal is greater than that of the corresponding original induction signal. It is determined that the capacitive touch display panel is not bent at the location between the drive signal line and the induction signal line if the intensity of the induction signal is equal to that of the corresponding original induction signal. On the capacitive touch display panel, the drive signal line and the induction signal line constitute two electrodes of a capacitor. If the straight-line distance between the drive signal line and the induction signal line is shortened because the capacitive touch display panel is bent, the capacitance value of a capacitor formed by the drive signal line and the induction signal line is increased. Compared with the case when the capacitive touch display panel is in the planar state, the induction signal received by the induction signal line serving as one electrode of the capacitor is enhanced because the capacitance value of the capacitor is increased. Therefore, it may be determined whether the capacitive touch display panel is bent at the bending location between the drive signal line and the induction signal line based on a comparison between the intensity of the induction signal and that of the corresponding original induction signal. Here, the induction signal received from the induction signal line may be interpreted as the quantity of electric charges on the induction signal line or a current signal on the induction signal line.

In some embodiments of the present disclosure, for each of the induction signal lines, the received induction signal also may be converted into a first digital signal, and the first digital signal may be compared with a second digital signal converted from the original induction signal.

A process of controlling the flexible capacitive touch display panel according to the above embodiment is described below in detail with reference to examples in FIGS. 3-7. In FIGS. 3-7, the bending location of the capacitive touch display panel is represented by a shadow.

Figure 3:
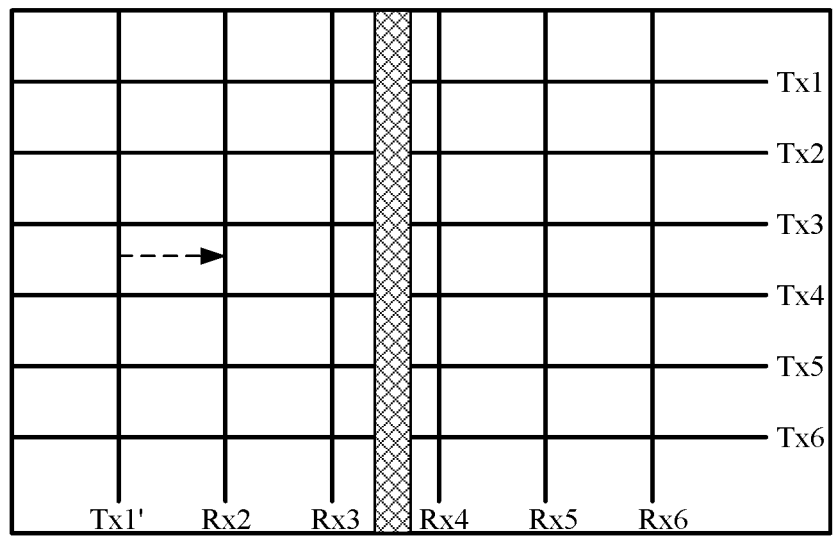
FIG. 3 is a schematic diagram illustrating a process of controlling a flexible capacitive touch display panel according to an embodiment of the present disclosure.

Referring to FIG. 3, the first column of signal line Rx1 is used as the drive signal line Tx1', the second column of signal line Rx2 parallel to and adjacent to the drive signal line Tx1' is used as an induction signal line. The drive signal is applied to the drive signal line Tx1', and an induction signal is received from the induction signal line Rx2.

The induction signal received from the second column of signal line Rx2 is compared with a corresponding original induction signal. It is determined that the capacitive touch display panel is not bent at the location between the first column of signal line Rx1 (the drive signal line Tx1') and the second column of signal line Rx2 because the intensity of the induction signal received from the second column of signal line Rx2 is equal to that of the corresponding original induction signal.

Figure 4:
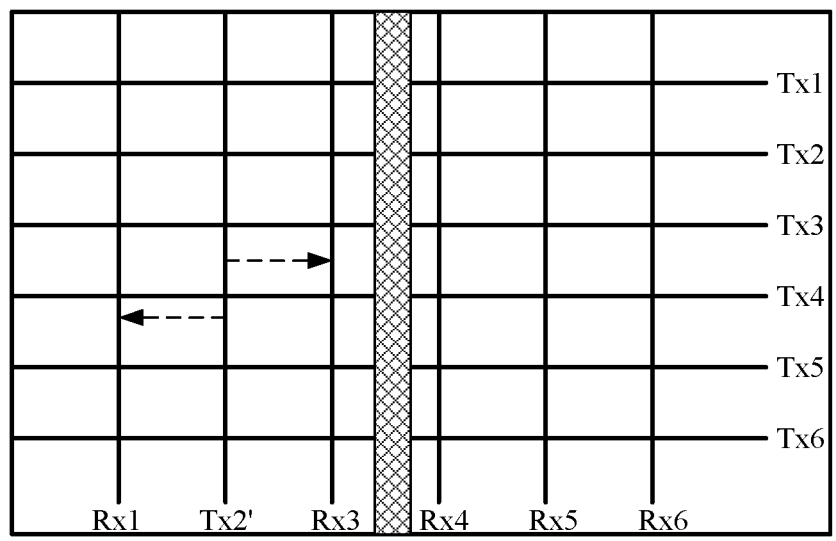
FIG. 4 is a schematic diagram illustrating a process of controlling a flexible capacitive touch display panel according to an embodiment of the present disclosure.

Referring to FIG. 4, the second column of signal line Rx2 is used as the drive signal line Tx2', the first column of signal line Rx1 and the third column of signal line Rx3 parallel to and adjacent to the drive signal line Tx2' are used as induction signal lines. The drive signal is applied to the drive signal line Tx2', and induction signals are received from the induction signal lines Rx1 and Rx3 respectively.

The induction signal received from the first column of signal line Rx1 is compared with a corresponding original induction signal. It is determined that the capacitive touch display panel is not bent at the location between the second column of signal line Rx2 (the drive signal line Tx2') and the first column of signal line Rx1 because the intensity of the induction signal received from the first column of signal line Rx1 is equal to that of the corresponding original induction signal. In an alternative embodiment, the comparison between the induction signal received from the first column of signal line Rx1 and the corresponding original induction signal may be omitted here because it has been determined, in the process as shown in FIG. 3, that the capacitive touch display panel is not bent at the location between the first column of signal line Rx1 and the second column of signal line Rx2.

The induction signal received from the third column of signal line Rx3 is compared with a corresponding original induction signal. It is determined that the capacitive touch display panel is not bent at the location between the second column of signal line Rx2 (the drive signal line Tx2') and the third column of signal line Rx3 because the intensity of the induction signal received from the third column of signal line Rx3 is equal to that of the corresponding original induction signal.

Figure 5:
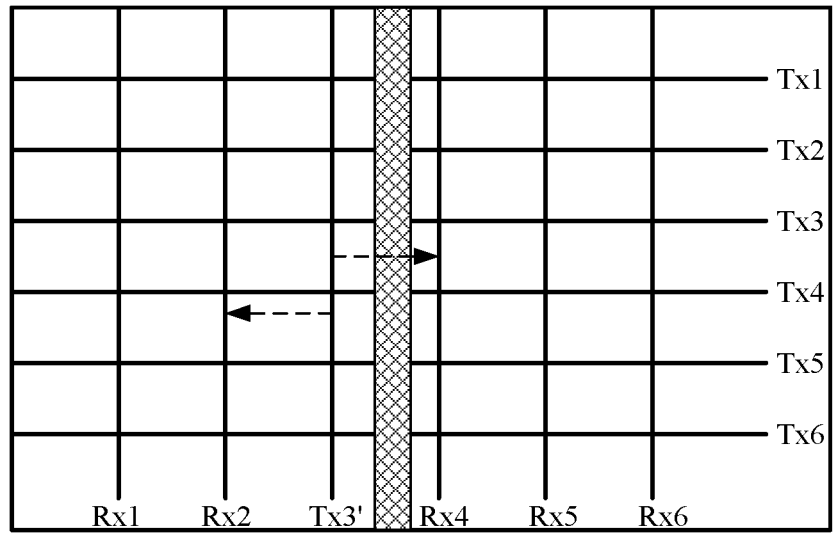
FIG. 5 is a schematic diagram illustrating a process of controlling a flexible capacitive touch display panel according to an embodiment of the present disclosure.

Referring to FIG. 5, the third column of signal line Rx3 is used as the drive signal line Tx3', the second column of signal line Rx2 and the fourth column of signal line Rx4 parallel to and adjacent to the drive signal line Tx3' are used as induction signal lines. The drive signal is applied to the drive signal line Tx3', and induction signals are received from the induction signal lines Rx2 and Rx4 respectively.

The induction signal received from the second column of signal line Rx2 is compared with a corresponding original induction signal. It is determined that the capacitive touch display panel is not bent at the location between the third column of signal line Rx3 (the drive signal line Tx3') and the second column of signal line Rx2 because the intensity of the induction signal received from the second column of signal line Rx2 is equal to that of the corresponding original induction signal. In an alternative embodiment, the comparison between the induction signal received from the second column of signal line Rx2 and the corresponding original induction signal may be omitted here because it has been determined, in the process as shown in FIG. 4, that the capacitive touch display panel is not bent at the location between the second column of signal line Rx2 and the third column of signal line Rx3.

The induction signal received from the fourth column of signal line Rx4 is compared with a corresponding original induction signal. It is determined that the capacitive touch display panel is bent at the bending location between the third column of signal line Rx3 (the drive signal line Tx3') and the fourth column of signal line Rx4 because the intensity of the induction signal received from the fourth column of signal line Rx4 is greater than that of the corresponding original induction signal.

Figure 6:
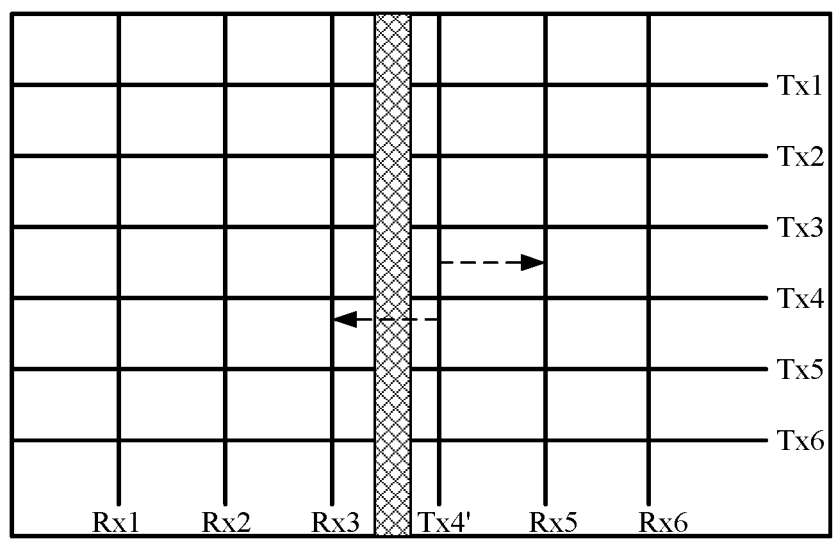
FIG. 6 is a schematic diagram illustrating a process of controlling a flexible capacitive touch display panel according to an embodiment of the present disclosure.

Referring to FIG. 6, the fourth column of signal line Rx4 is used as the drive signal line Tx4', the third column of signal line Rx3 and the fifth column of signal line Rx5 parallel to and adjacent to the drive signal line Tx4' are used as induction signal lines. The drive signal is applied to the drive signal line Tx4', and induction signals are received from the induction signal lines Rx3 and Rx5 respectively.

The induction signal received from the third column of signal line Rx3 is compared with a corresponding original induction signal. It is determined that the capacitive touch display panel is bent at the bending location between the fourth column of signal line Rx4 (the drive signal line Tx4') and the third column of signal line Rx3 because the intensity of the induction signal received from the third column of signal line Rx3 is greater than that of the corresponding original induction signal. In an alternative embodiment, the comparison between the induction signal received from the third column of signal line Rx3 and the corresponding original induction signal may be omitted here because it has been determined, in the process as shown in FIG. 5, that the capacitive touch display panel is bent at the bending location between the third column of signal line Rx3 and the fourth column of signal line Rx4.

The induction signal received from the fifth column of signal line Rx5 is compared with a corresponding original induction signal. It is determined that the capacitive touch display panel is not bent at the location between the fourth column of signal line Rx4 (the drive signal line Tx4') and the fifth column of signal line Rx5 because the intensity of the induction signal received from the fifth column of signal line Rx5 is equal to that of the corresponding original induction signal.

Figure 7:
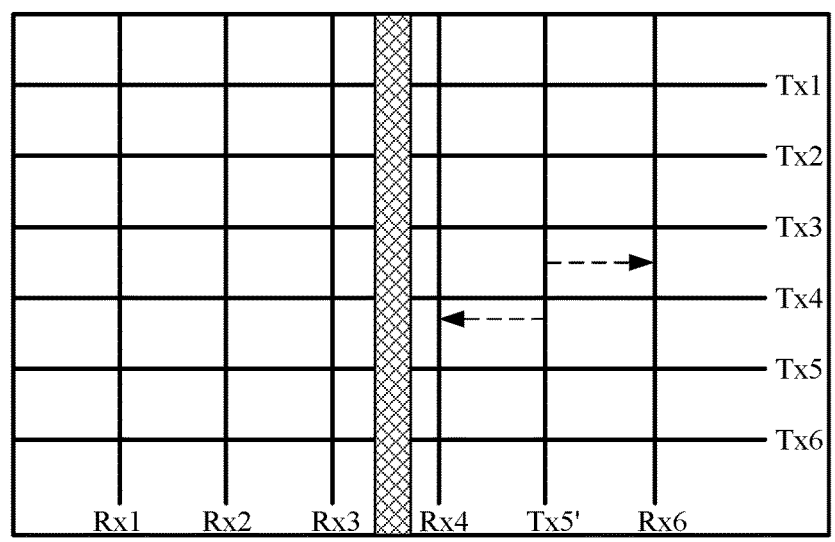
FIG. 7 is a schematic diagram illustrating a process of controlling a flexible capacitive touch display panel according to an embodiment of the present disclosure.

Referring to FIG. 7, the fifth column of signal line Rx5 is used as the drive signal line Tx5', and the fourth column of signal line Rx4 and the sixth column of signal line Rx6 parallel to and adjacent to the drive signal line Tx5' are used as induction signal lines. The drive signal is applied to the drive signal line Tx5', and induction signals are received from the induction signal lines Rx4 and Rx6 respectively.

The induction signal received from the fourth column of signal line Rx4 is compared with a corresponding original induction signal. It is determined that the capacitive touch display panel is not bent at the location between the fifth column of signal line Rx5 (the drive signal line Tx5') and the fourth column of signal line Rx4 because the intensity of the induction signal received from the fourth column of signal line Rx4 is equal to that of the corresponding original induction signal. In an alternative embodiment, the comparison between the induction signal received from the fourth column of signal line Rx4 and the corresponding original induction signal may be omitted here because it has been determined, in the process as shown in FIG. 6, that the capacitive touch display panel is not bent at the location between the fourth column of signal line Rx4 and the fifth column of signal line Rx5.

The induction signal received from the sixth column of signal line Rx6 is compared with a corresponding original induction signal. It is determined that the capacitive touch display panel is not bent at the location between the fifth column of signal line Rx5 (the drive signal line Tx5') and the sixth column of signal line Rx6 because the intensity of the induction signal received from the sixth column of signal line Rx6 is equal to that of the corresponding original induction signal.

The similar operations are executed for other columns of signal lines to determine whether the capacitive touch display panel is bent at a bending location between the drive signal line and the induction signal line. After the above operations are executed for all columns of signal lines, each row of signal lines is used as the drive signal line, and the same method is adopted to determine whether the capacitive touch display panel is bent at a bending location between the rows of signal lines. Those skilled in the art should know that in alternative embodiments of the present disclosure, the above operations may be executed first for the rows of signal lines and then for the columns of signal lines. Sequences of setting the drive signal lines are not limited in the embodiments of the present disclosure. That is, a technical solution that no matter which signal line is used as the drive signal line falls within the protection scope of the present disclosure.

All bending locations of the flexible capacitive touch display panel may be detected by using the method for controlling a flexible capacitive touch display panel according to the embodiments of the present disclosure.

Furthermore, in some embodiments of the present disclosure, it also may be determined whether the capacitive touch display panel is bent at the bending location between the drive signal line and the induction signal line by comparing a first induction signal with a second induction signal received respectively from a first induction signal line and a second induction signal line at both sides of the drive signal line. It is determined that the capacitive touch display panel is bent at a bending location between the drive signal line and the first induction signal line if the intensity of the first induction signal is greater than that of the second induction signal. The distance between the first induction signal line and the drive signal line is equal to that between the second induction signal line and the drive signal line when the capacitive touch display panel is in the planar state. Therefore, the capacitance value of a first capacitor formed by the drive signal line and the first induction signal line is equal to that of a second capacitor formed by the drive signal line and the second induction signal line. If the capacitive touch display panel is bent at the bending location between the drive signal line and the first induction signal line, the distance between the first induction signal line and the drive signal line is shortened, and thus the capacitance value of the first capacitor formed by the drive signal line and the first induction signal line is increased. If the capacitive touch display panel is still planar at the location between the drive signal line and the second induction signal line, the capacitance value of the second capacitor formed by the drive signal line and the second induction signal line remains unchanged. The intensity of the first induction signal is greater than that of the second induction signal because the capacitance value of the first capacitor is greater than that of the second capacitor. Here, the induction signal received from the induction signal line may be interpreted as the quantity of electric charges on the induction signal line or a current signal on the induction signal line.

Moreover, in this embodiment, for a signal line at the outermost side of the capacitive touch display panel, only one side of the capacitive touch display panel is provided with an induction signal line. Therefore, the drive signal may be not applied to the signal line at the outermost side of the capacitive touch display panel.

A process of controlling the flexible capacitive touch display panel according to the above embodiment is described again below in detail with reference to examples in FIGS. 4-7. In FIGS. 4-7, the bending location of the capacitive touch display panel is represented by a shadow.

Referring to FIG. 4, the second column of signal line Rx2 is used as the drive signal line Tx2', the first column of signal line Rx1 and the third column of signal line Rx3 parallel to and adjacent to the drive signal line Tx2' are used as induction signal lines. The drive signal is applied to the drive signal line Tx2', and induction signals are received from the induction signal lines Rx1 and Rx3 respectively. The induction signal received from the first column of signal line Rx1 is compared with the induction signal received from the third column of signal line Rx3. It is determined that the capacitive touch display panel is not bent at the location between the first column of signal line Rx1 and the third column of signal line Rx3 because the intensity of the induction signal received from the first column of signal line Rx1 is equal to that of the induction signal received from the third column of signal line Rx3.

Referring to FIG. 5, the third column of signal line Rx3 is used as the drive signal line Tx3', the second column of signal line Rx2 and the fourth column of signal line Rx4 parallel to and adjacent to the drive signal line Tx3' are used as induction signal lines. The drive signal is applied to the drive signal line Tx3', and induction signals are received from the induction signal lines Rx2 and Rx4 respectively. The induction signal received from the second column of signal line Rx2 is compared with the induction signal received from the fourth column of signal line Rx4. It is determined that the capacitive touch display panel is bent at the bending location between the third column of signal line Rx3 (the drive signal line Tx3') and the fourth column of signal line Rx4 because the intensity of the induction signal received from the fourth column of signal line Rx4 is greater than that of the induction signal received from the second column of signal line Rx2.

Referring to FIG. 6, the fourth column of signal line Rx4 is used as the drive signal line Tx4', the third column of signal line Rx3 and the fifth column of signal line Rx5 parallel to and adjacent to the drive signal line Tx4' are used as induction signal lines. The drive signal is applied to the drive signal line Tx4', and induction signals are received from the induction signal lines Rx3 and Rx5 respectively. The induction signal received from the third column of signal line Rx3 is compared with the induction signal received from the fifth column of signal line Rx5. It is determined that the capacitive touch display panel is bent at the bending location between the fourth column of signal line Rx4 (the drive signal line Tx4') and the third column of signal line Rx3 because the intensity of the induction signal received from the third column of signal line Rx3 is greater than that of the induction signal received from the fifth column of signal line Rx5.

Referring to FIG. 7, the fifth column of signal line Rx5 is used as the drive signal line Tx5', and the fourth column of signal line Rx4 and the sixth column of signal line Rx6 parallel to and adjacent to the drive signal line Tx5' are used as induction signal lines. The drive signal is applied to the drive signal line Tx5', and an induction signal is respectively received from the induction signal lines Rx4 and Rx6. The induction signal received from the fourth column of signal line Rx4 is compared with the induction signal received from the sixth column of signal line Rx6. It is determined that the capacitive touch display panel is not bent at the location between the fourth column of signal line Rx4 and the sixth column of signal line Rx6 because the intensity of the induction signal received from the fourth column of signal line Rx4 is equal to that of the induction signal received from the sixth column of signal line Rx6.

The similar operations are executed for other columns of signal lines to determine whether the capacitive touch display panel is bent at a bending location between the drive signal line and the induction signal line. After the above operations are executed for all columns of signal lines, each row of signal lines is used as the drive signal line, and the same method is adopted to determine whether the capacitive touch display panel is bent at a bending location between the rows of signal lines. Those skilled in the art should know that in alternative embodiments of the present disclosure, the above operations may be executed first for the rows of signal lines and then for the columns of signal lines. Sequences of setting the drive signal lines are not limited in the embodiments of the present disclosure. That is, a technical solution that no matter which signal line is used as the drive signal line falls within the protection scope of the present disclosure.

Further, in some embodiments of the present disclosure, if it is not determined that the capacitive touch display panel is bent by comparing the induction signals received from two induction signal lines at both sides of the drive signal line, the bending location may be further determined by comparing the induction signal received from a single induction signal line with its corresponding original induction signal.

Moreover, in practice, the bending location of the flexible capacitive touch display panel may cross over a plurality of signal lines. Therefore, in further embodiments of the present disclosure, after determining all bending locations of the capacitive touch display panel, if a plurality of parallel bending locations are detected on the capacitive touch display panel, it is determined whether a distance between two adjacent bending locations of the plurality of parallel bending locations is less than a threshold. Two adjacent bending locations having a distance less than the threshold are recognized as one bending location. In some embodiments of the present disclosure, this threshold may be a value preset based on bending characteristics of the flexible capacitive touch display panel. This threshold may be one time, two times, three times or even more times of the distance between two adjacent signal lines.

In an embodiment of the present disclosure, different from FIGS. 3-7, supposing the capacitive touch display panel is bent at a bending location from the second column of signal line Rx2 to the fifth column of signal line Rx5, and this threshold is set as twice of the distance between two adjacent signal lines.

In one example, by comparing the induction signal received from the induction signal line with an original induction signal, it is determined that the capacitive touch display panel is bent at the bending location (the first bending location) between the second column of signal line Rx2 and the third column of signal line Rx3, that the capacitive touch display panel is bent at the bending location (the second bending location) between the third column of signal line Rx3 and the fourth column of signal line Rx4, and that the capacitive touch display panel is bent at the bending location (the third bending location) between the fourth column of signal line Rx4 and the fifth column of signal line Rx5. Both of the distance between the first bending location and the second bending location and the distance between the second bending location and the third bending location are smaller than the threshold. Therefore, the three bending locations may be recognized as one bending location. This indicates that the capacitive touch display panel is bent at a bending location from the second column of signal line Rx2 to the fifth column of signal line Rx5.

In another example, by comparing induction signals received from two induction signal lines at both sides of the drive signal line, it is determined that the capacitive touch display panel is bent at the bending location (the first bending location) between the second column of signal line Rx2 and the third column of signal line Rx3 and the capacitive touch display panel is bent at the bending location (the second bending location) between the fourth column of signal line Rx4 and the fifth column of signal line Rx5. The intensity of the induction signal received from the fourth column of signal line Rx4 is equal to that of the induction signal received from the second column of signal line Rx2 when the drive signal is applied to the third column of signal line Rx3. Therefore, it cannot be determined that the capacitive touch display panel is bent at the location between the third column of signal line Rx3 and the fourth column of signal line Rx4. However, the distance between the first bending location and the second bending location which are adjacent is smaller than the threshold. Therefore, the two bending locations may be recognized as one bending location. This indicates that the capacitive touch display panel is bent at a bending location from the second column of signal line Rx2 to the fifth column of signal line Rx5.

The bending location of the capacitive touch display panel can be more accurately determined by using the method of this embodiment.

Since the operation manner for signal lines of the capacitive touch display panel according to the embodiments of the present disclosure is different from existing operation manners, in the process of performing the method for controlling a flexible capacitive touch display panel according to the embodiments of the present disclosure, a touch operation cannot be simultaneously performed on the capacitive touch display panel. Therefore, a condition for activating a determination of the bending location of the capacitive touch display panel is also set in the embodiments of the present disclosure. In one example, an attitude of the capacitive touch display panel is first detected before activating the determination of the bending location of the capacitive touch display panel. If the attitude of the capacitive touch display panel is detected as nonplanar, it is believed that the capacitive touch display panel is bent, and thus the determination of the bending location of the capacitive touch display panel is activated. Alternatively, in another example, an activation signal is first received before activating the determination of the bending location of the capacitive touch display panel. The determination of the bending location of the capacitive touch display panel is activated in response to the activation signal being received.

Figure 8:
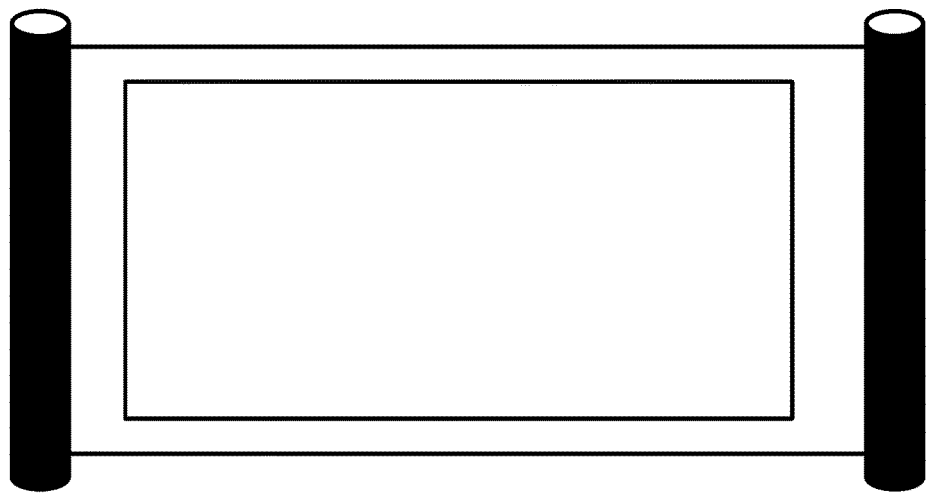
FIG. 8 is a schematic diagram illustrating an example of a bending location of a flexible capacitive touch display panel.

In some embodiments of the present disclosure, the method for controlling a flexible capacitive touch display panel may further include determining an initial system mode provided for the capacitive touch display panel based on the bending location of the capacitive touch display panel. A user may select the needed initial system mode by bending the capacitive touch display panel. The initial system mode may start an application program automatically for the user. For example, the system mode is determined as an artistic creation mode as shown in FIG. 8 if it is detected that the capacitive touch display panel is bent at edges on two sides of the capacitive touch display panel. In the artistic creation mode, a system may automatically start an application program providing a function of drawing or calligraphy writing for the user.

If it is detected that the capacitive touch display panel is bent at a plurality of parallel bending locations, it is determined that the capacitive touch display panel is bent into a ring or an approximate ring, such that the system mode is determined as a wristband mode. In the wristband mode, the system will provide an application program such as exercise log.

Figure 9:
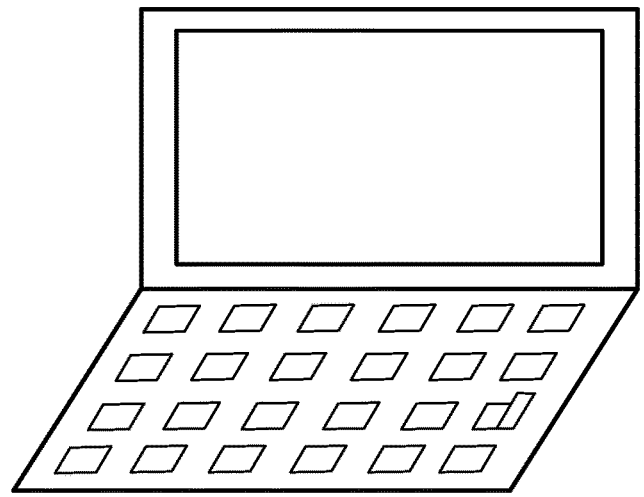
FIG. 9 is a schematic diagram illustrating another example of a bending location of a flexible capacitive touch display panel.
Figure 10:
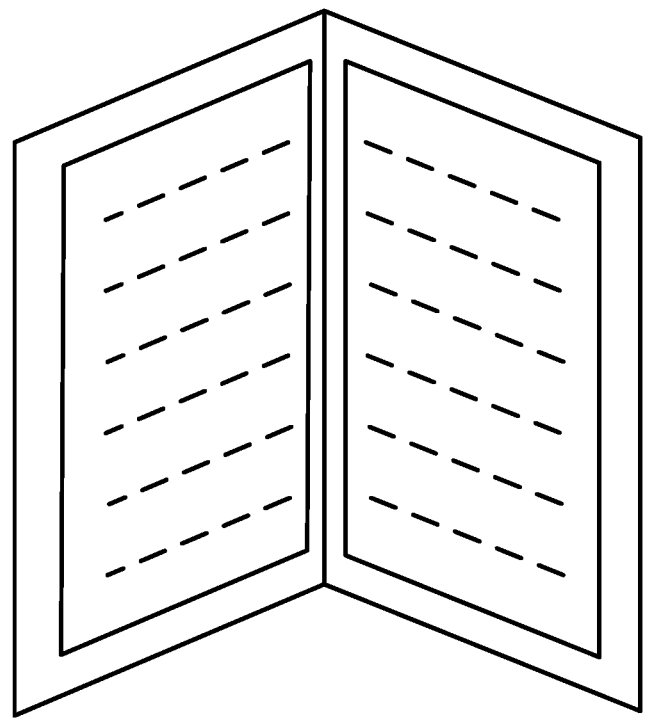
FIG. 10 is a schematic diagram illustrating still another example of a bending location of a flexible capacitive touch display panel.

If it is detected that the capacitive touch display panel is bent at its middle to be divided into two parts, attitudes of the two parts are further detected. For example, the system mode is determined as a laptop mode in the case that one of the two parts is parallel to ground but the other is not. As shown in FIG. 9, in the laptop mode, a keyboard is displayed on the part of the capacitive touch display panel parallel to ground, and the part of the capacitive touch display panel not parallel to ground serves as the display of the laptop. In the case that both parts are parallel to the ground, that is, in the case that the capacitive touch display panel is folded, the system mode is determined as a standby mode. The system mode is determined as an E-book mode as shown in FIG. 10 in the case that neither of the two parts is parallel to the ground. In this case, an E-book application program may be automatically started on the capacitive touch display panel.

The system mode used by the capacitive touch display panel determined in this embodiment is merely exemplary rather than restrictive, and in variation of this embodiment, the system mode also may include system modes different from the system mode enumerated in this embodiment. Furthermore, the system mode is merely an initial system mode, and the user may manually select other system modes as required.

Figure 11:
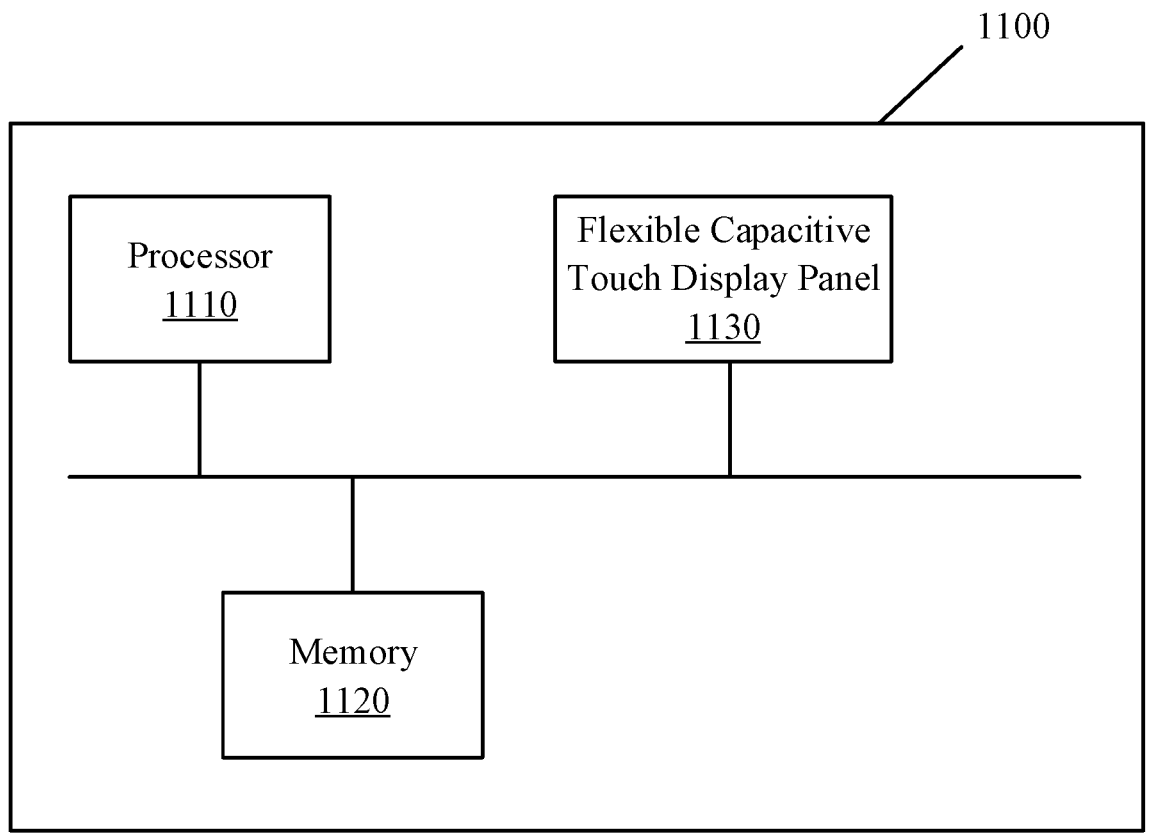
FIG. 11 is a schematic structural diagram of a touch display apparatus according to an embodiment of the present disclosure.

An embodiment of the present disclosure further provides a touch display apparatus. FIG. 11 illustrates a schematic structural diagram of the touch display apparatus 1100 according to an embodiment of the present disclosure.

The touch display apparatus includes a flexible capacitive touch display panel 1130, at least one processor 1110 connected to the capacitive touch display panel, and at least one memory 1120 having computer program stored thereon. The capacitive touch display panel 1130 is provided with a plurality of signal lines (not shown in FIG. 11, can be seen from FIGS. 3-7) arranged in a grid shape, and a signal line extending in a first direction and a signal line extending in a second direction are electrically insulated from each other. When the computer program is executed by the at least one processor, the touch display apparatus is caused to, for each signal line of the plurality of signal lines, apply a drive signal to the signal line as a drive signal line, receive, from a signal line parallel to and adjacent to the drive signal line as an induction signal line, an induction signal, and determine, in response to an intensity of the received induction signal being increased, that the capacitive touch display panel is bent at a bending location between the drive signal line and the induction signal line.

In some embodiments of the present disclosure, the touch display apparatus can convert the induction signal received from the induction signal line into a first digital signal, such that the touch display apparatus compares the first digital signal with a second digital signal converted from the original induction signal stored in the memory.

In some embodiments of the present disclosure, the capacitive touch display panel further includes at least two spatial location detecting apparatuses. The at least two spatial location detecting apparatuses are respectively positioned on at least one group of opposite sides of the capacitive touch display panel. For example, supposing the capacitive touch display panel includes two spatial location detecting apparatuses, the two spatial location detecting apparatuses are positioned either on left and right sides of the capacitive touch display panel or on upper and lower sides of the capacitive touch display panel respectively. Supposing the capacitive touch display panel includes four spatial location detecting apparatuses, the four spatial location detecting apparatuses are positioned on upper, lower, left, and right sides of the capacitive touch display panel respectively. The number of the spatial location detecting apparatuses may be set upon required. The spatial location detecting apparatuses can detect an attitude of the capacitive touch display panel and transmit the attitude of the capacitive touch display panel to the processor. The determination of the bending location of the capacitive touch display panel is activated if the attitude of the capacitive touch display panel is nonplanar. In one example, the spatial location detecting apparatus may be, for example, a gyroscope. The gyroscope may determine the attitude of the capacitive touch display panel by obtaining spatial location coordinates of the gyroscope.

In some embodiments of the present disclosure, the capacitive touch display panel may further include a key. The processor may receive an activation signal if the key is pressed. The activation signal indicates that the capacitive touch display panel has been bent. The determination of the bending location of the capacitive touch display panel is activated if the activation signal is received by the capacitive touch display panel.

The touch display apparatus provided the embodiments of the present disclosure may be applied to any flexible electronic device having a touch display function, for example, a TV set, a mobile telephone, a smart phone, a tablet computer, a wearable device, and so on.

As used herein and in the appended claims, the singular form of a word includes the plural, and vice versa, unless the context clearly dictates otherwise. Thus, singular words are generally inclusive of the plurals of the respective terms. Similarly, the words "include" and "comprise" are to be interpreted as inclusively rather than exclusively. Likewise, the terms "include" and "or" should be construed to be inclusive, unless such an interpretation is clearly prohibited from the context. Where used herein the term "examples," particularly when followed by a listing of terms is merely exemplary and illustrative, and should not be deemed to be exclusive or comprehensive.

Further adaptive aspects and scopes become apparent from the description provided herein. It should be understood that various aspects of the present disclosure may be implemented separately or in combination with one or more other aspects. It should also be understood that the description and specific embodiments in the present disclosure are intended to describe rather than limit the scope of the present disclosure.

A plurality of embodiments of the present disclosure has been described in detail above. However, apparently those skilled in the art may make various modifications and variations on the embodiments of the present disclosure without departing from the spirit and scope of the present disclosure. The scope of protecting of the present disclosure is limited by the appended claims.

What is claimed is:

1. A method for controlling a flexible capacitive touch display panel, wherein the capacitive touch display panel is provided with a plurality of signal lines arranged in a grid shape, wherein a signal line extending in a first direction and a signal line extending in a second direction are electrically insulated from each other, the method comprising, for each of the plurality of signal lines:

applying a drive signal to the signal line as a drive signal line;

receiving, from a signal line parallel to and adjacent to the drive signal line as an induction signal line, an induction signal;

comparing a first induction signal of the induction signal line received from a first induction signal line with a second induction signal of the induction signal line received from a second induction signal line;

determining that the capacitive touch display panel is bent at a bending location between the drive signal line and the first induction signal line in response to the intensity of the first induction signal being greater than that of the second induction signal; and in response to the bending location being not determined:

comparing, for each induction signal line, the induction signal received from the induction signal line with an original induction signal received from the induction signal line when the capacitive touch display panel is in a planar state; and determining that the capacitive touch display panel is bent at the bending location between the drive signal line and the induction signal line in response to the intensity of the induction signal being greater than that of the original induction signal.

2. The method according to claim 1, wherein for each induction signal line, comparing the induction signal received from the induction signal line with an original induction signal received from the induction signal line when the capacitive touch display panel is in a planar state comprises:

converting the induction signal received from the induction signal line into a first digital signal; and comparing the first digital signal with a second digital signal converted from the original induction signal.

3. The method according to claim 1 further comprising: detecting an attitude of the capacitive touch display panel; and initiating a determination of the bending location of the capacitive touch display panel in response to the attitude of the capacitive touch display panel being detected as nonplanar.

4. The method according to claim 1 further comprising: receiving an activation signal; and initiating a determination of the bending location of the capacitive touch display panel in response to the activation signal being received.

5. The method according to claim 1 further comprising: determining, in response to a plurality of parallel bending locations being detected on the capacitive touch display panel, whether a distance between two adjacent bending locations of the plurality of parallel bending locations is less than a threshold; and recognizing two adjacent bending locations having a distance less than the threshold as one bending location.

6. The method according to claim 1 further comprising determining a system mode used by the capacitive touch display panel based on the bending location of the capacitive touch display panel, wherein the system mode is determined as an artistic creation mode in response to the capacitive touch display panel being bent at edges on two sides of the capacitive touch display panel, wherein the system mode is determined as a wristband mode in response to the capacitive touch display panel being bent at a plurality of parallel bending locations, and wherein in response to the capacitive touch display panel being bent at its middle to be divided into two parts:
the system mode is determined as a laptop mode in the case that one of the two parts is parallel to ground but the other is not;
the system mode is determined as a standby mode in the case that both parts are parallel to the ground; and
otherwise, the system mode is determined as an E-book mode.

7. A touch display apparatus comprising a flexible capacitive touch display panel, at least one processor connected to the capacitive touch display panel, and at least one memory having computer program stored thereon, wherein the capacitive touch display panel is provided with a plurality of signal lines arranged in a grid shape, and wherein a signal line extending in a first direction and a signal line extending in a second direction are electrically insulated from each other, wherein when the computer program is executed by the at least one processor, the touch display apparatus is caused to, for each signal line of the plurality of signal lines:

apply a drive signal to the signal line as a drive signal line;

receive, from a signal line parallel to and adjacent to the drive signal line as an induction signal line, an induction signal;

compare a first induction signal of the induction signal line received from a first induction signal line with a second induction signal of the induction signal line received from a second induction signal line;

determine that the capacitive touch display panel is bent at a bending location between the drive signal line and the first induction signal line in response to the intensity of the first induction signal being greater than that of the second induction signal; and in response to the bending location being not determined:

compare, for each induction signal line, the induction signal received from the induction signal line with an original induction signal received from the induction signal line when the capacitive touch display panel is in a planar state; and determine that the capacitive touch display panel is bent at the bending location between the drive signal line and the induction signal line in response to the intensity of the induction signal being greater than that of the original induction signal.

8. The touch display apparatus according to claim 7, wherein when the computer program is executed by the at least one processor, the touch display apparatus is caused to, for each induction signal line, compare the induction signal received from the induction signal line with an original induction signal received from the induction signal line when the capacitive touch display panel is in a planar state by:

converting the induction signal received from the induction signal line into a first digital signal; and comparing the first digital signal with a second digital signal converted from the original induction signal, wherein the second digital signal is stored in the at least one memory.

9. The touch display apparatus according to claim 7, wherein the capacitive touch display panel further comprises at least two spatial location detecting apparatuses, wherein the at least two spatial location detecting apparatuses are respectively positioned on at least one group of opposite sides of the capacitive touch display panel, and can detect an attitude of the capacitive touch display panel and transmit the attitude of the capacitive touch display panel to the at least one processor, wherein when the computer program is executed by the at least one processor, the touch display apparatus is further caused to initiate a determination of the bending location of the capacitive touch display panel in the response to the attitude of the capacitive touch display panel being nonplanar.

10. The touch display apparatus according to claim 9, wherein the spatial location detecting apparatus comprises a gyroscope.

11. The touch display apparatus according to claim 7, wherein the capacitive touch display panel further comprises a key configured to transmit an activation signal to the at least one processor in response to the key being pressed, wherein when the computer program is executed by the at least one processor, the touch display apparatus is further caused to initiate a determination of the bending location of the capacitive touch display panel in response to the activation signal being received.

12. The touch display apparatus according to claim 7, wherein when the computer program is executed by the at least one processor, the touch display apparatus is further caused to:

determine, in response to a plurality of parallel bending locations being detected on the capacitive touch display panel, whether a distance between two adjacent bending locations of the plurality of parallel bending locations is less than a threshold; and recognize two adjacent bending locations having a distance less than the threshold as one bending location.

13. The touch display apparatus according to claim 12, wherein when the computer program is executed by the at least one processor, the touch display apparatus is further caused to:

determine a system mode used by the capacitive touch display panel based on the bending location of the capacitive touch display panel, wherein the system mode is determined as an artistic creation mode in response to the capacitive touch display panel being bent at edges on two sides of the capacitive touch display panel, wherein the system mode is determined as a wristband mode in response to the capacitive touch display panel being bent at a plurality of parallel bending locations, and wherein in response to the capacitive touch display panel being bent at its middle to be divided into two parts:

the system mode is determined as a laptop mode in the case that one of the two parts is parallel to ground but the other is not;

the system mode is determined as a standby mode in the case that both parts are parallel to the ground; and otherwise, the system mode is determined as an E-book mode.

* * * * *